United States Patent [19]
Lane et al.

[11] Patent Number: 5,126,052
[45] Date of Patent: Jun. 30, 1992

[54] CONDENSATE POLISHING SYSTEM INCORPORATING A MEMBRANE FILTER

[75] Inventors: Marvin Lane, Cranford; Frank Matunas, Union, both of N.J.

[73] Assignee: The Graver Company, Union, N.J.

[21] Appl. No.: 652,680

[22] Filed: Feb. 7, 1991

[51] Int. Cl.$^5$ .............................................. B01D 61/04
[52] U.S. Cl. .................................. 210/639; 210/652; 210/746; 210/500.23
[58] Field of Search ............... 210/686, 639, 657, 650, 210/652, 321.89, 500.23, 746

[56] References Cited

U.S. PATENT DOCUMENTS

| | | | |
|---|---|---|---|
| 4,200,695 | 4/1980 | Chong et al. | 210/686 X |
| 4,276,177 | 6/1981 | Smith | 210/638 |
| 4,775,471 | 10/1988 | Nagai et al. | 210/323.2 |
| 4,830,757 | 5/1989 | Lynch et al. | 210/746 X |
| 5,039,416 | 8/1991 | Loew et al. | 210/639 X |

FOREIGN PATENT DOCUMENTS 59-87092 5/1984 Japan.

OTHER PUBLICATIONS

Publication—*Metal Ion Scavenging From Water With Fine Mesh Ion Exchangers and Microporous Membranes* from Env. Progress, vol. 8, No. 1, Feb. 1989.
Publication—*Operational Experience of Hollow Fiber Filter for Condensate of BWR.*
Publication—*Hollow Fiber Membrane Filter.*
Brochure—*BIOCRYL Bioprocessing Aids* May 1987.
Toshiba Literature—*Nuclear Power Plant Hollow Fiber Filter.*

Primary Examiner—Frank Spear
Attorney, Agent, or Firm—Dressler, Goldsmith, Shore, Sutker & Milnamow, Ltd.

[57] ABSTRACT

A method and apparatus for polishing a condensate is provided wherein the condensate contains both suspended and colloidally dispersed solid impurities, and also intermittent and variable levels of ionic impurities and dissolved silica. When the ionic impurities exceed a preselected level, a finely divided ion exchange resin mixture is first admixed with the condensate at a rate sufficient to reduce the level of such impurities to a preselected level within a preselected contact time period. Thereafter, the resulting condensate is passed through a membrane filtration device to remove such suspended and dispersed solid impurities. A simple, effective and reliable retrofittable apparatus adapted for use with BWR's fitted with precoat filter systems is provided.

28 Claims, 3 Drawing Sheets

FIG. I

CONDENSATE POLISHING SYSTEM INCORPORATING A MEMBRANE FILTER

TECHNICAL FIELD

The present invention is directed to a method and apparatus for polishing a condensate, or other liquids containing dispersed solids and heavy metal ions, to remove therefrom both solute impurities and also suspended and colloidally dispersed solid impurities by initially admixing finely divided ion exchange resin with the condensate and then passing the resulting effluent through a membrane filter means.

BACKGROUND OF THE INVENTION

Condensate water derived from the condenser of a steam turbine or turbines typically may contain impurities in the form of both (a) suspended and colloidally dispersed particulate solids and (b) dissolved ionic and nonionic solutes, including silica and silicates. The solute materials may be only intermittently present. The particulate solids are mainly iron oxide-containing corrosion products commonly called "crud". The condensate needs to be purified or "polished" before being recycled for reconversion to steam to avoid contaminant desposition upon such surfaces as turbine blades, boilers, pipes, and the like. In the case of condensate derived from the steam produced in a boiling water reactor (BWR), such contaminants may include radioactive substances, such as iron, or the like.

At BWRs constructed in recent years, condensate polishing has commonly been achieved by directing the condensate under pressure through vessels containing filter elements precoated with a thin layer of powdered ion exchange resin. Periodically, the precoat layer must be removed from the precoat filter elements and replaced with a fresh precoat layer. The material of the spent precoat layer is typically discarded. Examples of such precoat filter systems are disclosed, for example, in U.S. Pat. Nos. 3,250,703 and 4,269,707. In certain instances, the spent ion exchange resin from a discarded precoat layer is an undesirable source of a radioactive waste material, and the disposal thereof may create problems. A precoat filter is characteristically able to remove crud solids in a condensate down to levels that are about 2 to 3 ppb (parts per billion).

Recently, in Japan, a condensate polishing system has been proposed that utilizes a hollow fiber filter (HFF) in combination with a downstream mixed ion exchange resin bed demineralizer. An HFF utilizes a plurality of hollow fiber membranes that each have a pore size smaller than the size of suspended solids present in the condensate. The hollow fiber membranes are formed in a bundle and secured in place in a module that is supported vertically in a filter vessel. HFF filters are available commercially and methods for their manufacture are known to the prior art. When the condensate to be recycled is directed against the HFF, the suspended solid particles contained therein are retained on the fiber surfaces and the treated condensate flows through the hollow fiber membranes.

An HFF has been shown to be capable of reducing dispersed crud solids in a condensate down to levels that are as low as about 0.1 ppb. However, unlike a precoat filter, an HFF does not remove dissolved solute impurities. Unfortunately, dissolved impurities may at times be present in a condensate at levels which are undesirable, and even damaging, particularly when there is a condenser leak.

The current HFF containing-systems in use in Japan include deep bed demineralizers downstream of the HFF. The resulting combined system has sufficient capacity to remove dispersed crud solids, and ionic impurities and silica from an influent condensate undergoing purification for recycling purposes, so that such an HFF-containing system may be substituted for the conventional condensate polishing precoat filter.

However, with the exception of a few plants, the BWR plants in the United States that are equipped with precoat filter/demineralizer condensate polishing systems are typically not equipped with such deep demineralizer beds. Accordingly, the retrofitting of most existing BWR power plants in the United States to utilize HFF-containing systems based on such Japanese technology would require a substantial additional new capital investment to provide a deep bed demineralizer system to remove the ionic impurities and/or silica that may at times be present at objectionable levels in the condensate effluent from an HFF.

There is a need in the condensate polishing art for a system that permits economical utilization of hollow fiber or other type of membrane filters in existing United States BWR power plants. The resulting membrane-containing system needs to accomplish both crud removal and ion removal when ionic impurities (including silica) are intermittently present. Ideally, such a new system should be retrofittable to the existing precoat filter systems present in existing BWR power plants at relatively low cost and in a relatively simple manner. The present invention provides such a system.

SUMMARY OF THE INVENTION

The present invention provides an improved method and associable apparatus for polishing a steam condensate by both (a) removing therefrom suspended and colloidally dispersed solid impurities and (b) reducing ionic impurities and silica present therein. The invention utilizes both a membrane filtration device and a finely divided particulate ion exchange resin.

The inventive method involves passing the condensate through a membrane filter after the condensate has been preliminarily admixed with a finely powdered ion exchange resin upstream from a membrane filter.

The inventive apparatus involves a combination of membrane filter means and associated apparatus, means for introducing and admixing a quantity of finely powdered ion exchange resin with a condensate upstream from such filter, means for monitoring the level of ionic impurities present in such condensate, and means for controlling both the introduction and quantity of such ion exchange resin into said condensate.

The relationship between the position along a flowing condensate stream where the ion exchange resin is introduced and the position where the resulting condensate stream thereafter enters the membrane filter is preferably such that, for a given condensate stream flow rate, a suitable contact time between the condensate and the ion exchange resin is achieved to accomplish a desired reduction in solutes in the condensate before the ion exchange resin is separated from the condensate by the membrane filter.

The relationship between the level of ionic impurities in a condensate stream and the quantity of ion exchange resin charged per unit volume of condensate stream is preferable such that, for a given condensate steam flow rate, and for a given contact time period between the condensate and the ion exchange resin, the starting level of ionic impurities in the condensate is reduced to a final level that is within a preselected minimum range.

Since the flow rate and contact time period tend to fall within fixed limits set by, or preselected for, a given system, for purposes of practicing the present invention, it is convenient and sufficient to continuously monitor the level of ionic impurities present in the starting condensate or in the boiler water or reactor water. Then, when such a level exceeds a preselected maximum value, introduction of the particulate ion exchange resin into the condensate stream is carried out. The quantity of the ion exchange resin so introduced is selected to be such that, for a preselected condensate flow rate and a preselected contact time period, such final level of impurities achieved in the so treated condensate is within such preselected range when such treated condensate enters the membrane filter device.

When, subsequently, the level of ionic impurities present in a starting condensate stream drops below such prechosen maximum value or some other prechosen value, introduction of the particular ion exchange resin into the condensate stream is preferably terminated.

It is desireable to maintain the powdered cation and anion exchange resins in suspension in the throughflowing condensate as long as possible in order to utilize more of the capacity of the resins. To do this the hydraulics of the distribution system within the membrane filter vessel are preferably designed (or redesigned) in such a way as to induce low velocity currents in the lower portion of the vessel to allow a gentle "rolling" type of motion of the accumulated resin, thus allowing it to settle toward the bottom of the vessel.

In the most widely used filter/demineralizer design, the filter elements (later membrane modules) are connected to a plenum chamber defined by a concaved dish and the bottom head. The effluent from the elements or membrane modules collects in the plenum and flows therefrom to service or storage. The influent enters at the bottom and is distributed by a distribution plate above the plenum across the tubesheet and flows independently of the elements or membrane modules.

By maintaining a relatively low entrance velocity from the distribution plate, the accumulated resin migrates toward the lower part of the vessel, forming a blanket with a rolling type motion. As the run progresses, this blanket thickens as the concentration of resin increases, improving the efficiency of the process. The addition of fresh, partially exhausted ion exchange material and the accumulated material in the vessel act synergistically in this case.

The prechosen stream flow rate through the membrane filter is achieved by a pump that is able to develop variable pump pressures within a predetermined range. When the accumulated ion exchange resin particles in the membrane filter housing reaches a preselected level, or when the pump pressure required to maintain a preselected flow rate at some location or locations along this stream flow pathway reaches a preselected level, then usage of the first membrane filter assembly is stopped and flow of the ion exchange resin-treated condensate stream is switched automatically to a second such membrane filter assembly. The first membrane filter assembly is then subjected to purging to remove the accumulated ion exchange resin particles and to clean the membrane modules. By using two or more such filter membrane vessel assemblies, continuous operation of the condensate polishing system is achieved and maintained indefinitely.

In an individual membrane module of an array, the membrane module characteristics are selected to achieve desired array performance characteristics during operation of a given system of this invention.

A principle feature of the present invention is the production of a polished condensate from an impure starting condensate by a two-step procedure of first admixing controlled quantities of fine mesh ion exchange resin particles with the starting condensate followed by passing the resulting condensate through a membrane filter means. The need to pass the polished condensate effluent from the membrane filter means through a subsequent deep ion exchange resin demineralizer bed is avoided in a simple and completely effective manner. The two-step procedure is reliable and avoids both the investment of capital for constructing and installing such a deep resin bed and also the costs of operating and maintaining such a bed. The methodology and apparatus needed to install and practice the present two-step procedure is relatively inexpensive and reliable.

Another principle feature of the present invention is that the admixing of ion exchange resin particles with the condensate stream may be initiated only when the level of solute impurities in the system rises above a preselected level, such as characteristically intermittently occurs during condensate polishing. Also, such admixing can be terminated when the level of solute impurities in the condensate stream falls below a preselected value. Further, the rate of admixing of resin particles with the condensate stream, once initiated, is regulatable so as to be sufficient for achieving a desired level of solute impurities in the condensate stream at the end of the contact time period. Thus, usage of the ion exchange resin particles is limited to an as needed basis, thereby making system operation efficient and economical and also reducing the need for, and extending the time interval for, membrane module cleaning operations. This feature is important because extended run length time periods may occur when the levels of solute impurities is below a preselected level and no ion exchange resin feeding is required.

Another feature of the present invention is that it can be practiced by utilizing membrane filter modules that are disposed in cartridges which are easily retrofittable to existing precoat filter vessels in BWR plants.

Another feature of the system of the present invention is that it can accommodate a wide range of ionic impurity levels that can be conveniently measured by conductance. Thus, excellent and reliable protection against impurities introduced into condensate as a result of a system leak, or the like, is provided. Also, ability is provided to maintain condensate purity during polishing when a system condenser leak or the like is occurring, thereby insuring an orderly shutdown.

Another feature of the invention is that lower effluent crud and/or suspended or colloidal solids levels is achieved in combination with lower solute impurity levels in a polishing condensate than was possible with the prior art precoat filter systems.

Another feature of the invention is that the need for precoating of filter systems with a particulate ion exchange resin before polishing is avoided.

Another feature of the invention is that solid particulate wastes from a condensate polisher are reduced compared to known prior art procedures.

Another feature of the invention is that it is readily retrofittable at low relative cost to plants which are presently using precoat filter systems.

Another feature of this invention is that the method and apparatus of the invention is also suitable for use in the purification of liquids other than steam condensates including liquids containing dispersed solids and heavy metal ions, such as the liquids which are produced downstream in sewage treating, in metal plating, and in other clean-up operations involving treatment of otherwise environmentally undesirable wastes. The invention is not limited to hollow fibers, but includes such devices as spiral membranes, all of which can be used in crossflow and/or dead-end mode, as directed by the specific application. As governmental agencies raise the minimum standards for discharge of liquids into the environment, the method and apparatus provided by this invention is believed to have rising importance as a practical and economical liquid treatment means.

Other and further aims, purposes, features, advantages, and the like will be apparent to those skilled in the art from the appended drawings, teachings and claims contained herein.

Figure 1:
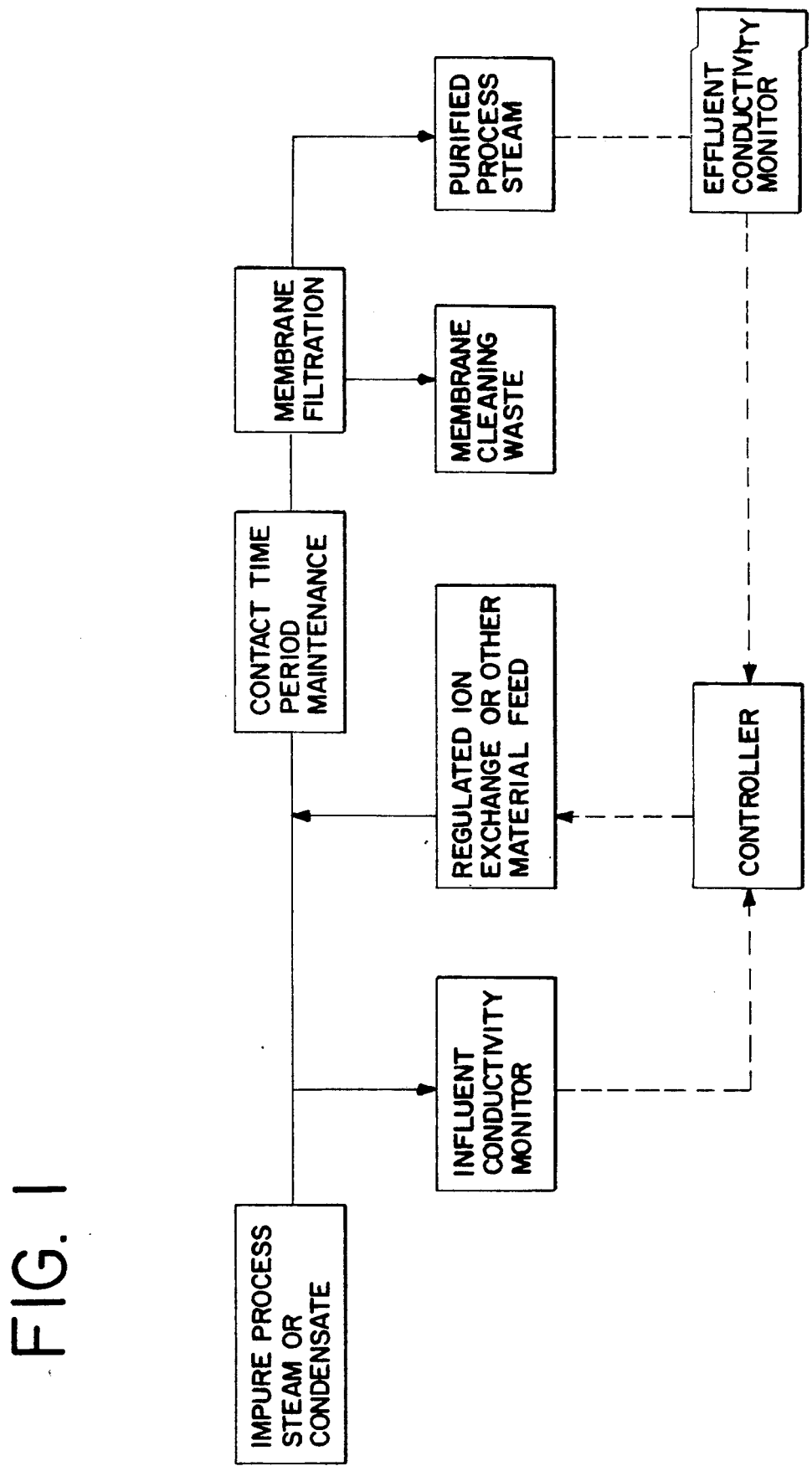
FIG. 1 is a simplified flow diagram in block form illustrating the method of the present invention.

DETAILED DESCRIPTION OF THE INVENTION (a) The Ion Exchange Resin Particles

The ion exchange resins utilized in the practice of this invention are in the form of particles having a size in the range of about 10 to about 200 microns (micrometers). The term "mesh" has reference to standard U.S. Bureau of Standards mesh sizes. Preferred ion exchange resin particle sizes are in the size range of about 30 to about 60 microns (about 400 to about 230 mesh). With such particle sizes, rapid ion exchange kinetics are usually observed.

The ion exchange resin used is preferably comprised of a mixture of cation exchange resin particles and anion exchange resin particles physically mixed together.

The cation exchange resin employed is a highly polymerized synthetic organic polymer consisting of a large nondiffusible anion and a simple, diffusible cation. Such cation can be exchanged for a cation in the medium with which such resin is contacted. Typically, such a cation exchange resin contains sulfonic acid groups which are functionally bound to a divinylbenzene-styrene copolymer to an extent of not more than about 10% and preferably is so cross-linked to an extent in the range of about 6 to about 9%. Preferably the cation exchange resin is initially in the hydrogen form.

Examples of commercially available cation exchange resins in the bead form suitable for conversion to the hydrogen form and powdering are Dowex-50 and Amberlite IR-120 manufactured by Dow Chemical Company and Rohm and Haas Corporation, respectively. The resins are normally supplied in the sodium form but are also available form these and other manufacturers in the hydrogen form. High purity powdered hydrogen form cation exchange resin suitable for use in this process are also available commercially as Graver Powdex PCH manufactured by The Graver Company.

The anion exchange resin employed is a highly polymerized synthetic organic compound having fixed electropositive charges and having the capacity to exchange negatively charged diffusible anions. Typically, such an anion exchange resin contains quaternary ammonium groups which are functionally bound to a polymeric backbone structure. Initially, such an anion exchange resin is preferably in the hydroxyl form. A present preference is to employ a divinylbenzenestyrene copolymer as the resin backbone. Such a resin is preferably cross-linked with divinylbenzene or other cross-linking agent to an extent that is in the range of about 6 to about 8%.

Examples of commercially available anion exchange resin in the bead form suitable for powdering after conversion from the chloride to the hydroxide form are Dowex-1 and Amberlite IRA-400 manufactured by Dow Chemical Company and Rohm and Haas Corporation, respectively. The resins are also available from them and other manufacturers in the hydroxide form ready for powdering. A high purity powdered hydroxide form anion exchange resin is available commercially as Graver Powdex PAO manufactured by The Graver Company.

In such an ion exchange resin mixture, the dry weight ratio of the cation exchange resin to the anion exchange resin is in the range of about 1:1 to about 3:1, and preferably in the range of about 0.5:1 to about 2:1.

Other powdered, high-purity ion exchange resins, polymeric adsorbents, activated carbon and the like may be added in place of one or another of the cation and anion exchange powders or in addition to them. These materials can be used to remove impurities not removed by the cation and anion resins previously described or to remove them more completely or more economically. To qualify for use in this process, the materials must not add any objectionable impurities to the system. In practically all cases, commercial products require additional rigorous purification before they are acceptable for use.

Examples of some functional polymers suitable for use in this process after appropriate additional purification are carboxylic type cation exchangers such as Amberlite IRC-50 or IRC-84; or a weakly basic anion resin such as Amberlite IRA-68, and adsorbents such as Amberlite XAD2, all of which are manufactured by Rohm and Haas Corporation.

If used as a third component, the amount used in relation to the basic resins can vary from, say, 10% of the primary or basic resins to say 80%. Optimum ratios must be determined experimentally.

It is also contemplated that filter aid materials may also be mixed with the ion exchange resins and/or other active particulate materials as disclosed in U.S. Pat. No. 4,238,334.

The points of addition can be separated for each of the powders being fed, but normally they would all be mixed in a single slurry tank in a fixed ratio one to the other and pumped into the influent line as a 3 to 7% W/W slurry.

(b) The Condensate Polishing Process

A steam condensate comprised of water having traces of (a) suspended and colloidally dispersed solid impurities, and traces of (b) dissolved solutes including silica, is a typical liquid that may be treated in accord with the present invention. The solutes are typically inorganic although some organic impurities may also be present in such a condensate. The level of solutes in a starting condensate tends to be variable and intermittent with such level tending to rise under power plant operating conditions, such as start-ups, shutdowns, load swings or condenser leaks.

A typical starting steam condensate has the following compositional characteristics when the level of solutes therein is at operationally safe or acceptable levels.

| Type of Plant | Fossil Fired | BWR |
| --- | --- | --- |
| Maximum Impurity (ppb) | | |
| Suspended Solids (crud) | 5 | 3 |
| Total Dissolved Solids (less ammonia) | 25 | 10 |
| Dissolved Silica | 10 | 5 |
| Total Iron | 5 | 2.5 |
| Total Copper | 2 | 0.5 |
| Sodium | 5 | 10 |
| Acid Conductivity (micromhos/centimeter) | 0.1 | 0.08 |

A typical starting steam condensate has the following compositional characteristics when the level of solutes therein is at operationally unsafe or unacceptable levels:

| Type of Plant | Fossil | BWR |
| --- | --- | --- |
| Typical Influent (ppb) | | |
| Suspended Solids | 5–10 | 8–20 |
| Total Dissolved Solids (except $NH_3$) | 30–40 | 10–30 |
| Dissolved Silica | 10–20 | 5–15 |
| Total Iron | 5–15 | 5–10 |
| Total Copper | 2–4 | 1–4 |
| Sodium | 3–10 | 5–15 |
| Acid Conductivity (micromhos/centimeter) | 0.1–0.3 | 0.1 |

Such starting steam condensates are, for present purposes, preferably derived from the condenser or condensers of a steam turbine or turbines in which the operational steam is generated in a BWR.

At the time of use in the practice of the process of this invention, the starting condensate is typically at a temperature that is preferably in the range of about 32° to about 60° C. (about 90 to about 140° F.), and is preferably at a pressure that is in the range of about 100 psi to about 700 psi (about 6.8 to about 48 atmospheres).

Referring to FIG. 1 and the process flow diagram shown therein, an impure condensate stream, characterized as above described, is monitored for ionic impurities. Ion exchange resin particles are admixed with the stream, the amount added preferably, but not necessarily, being in proportion to the level of ionic impurities present in the stream. Particularly when the level of ionic impurities is variable and/or intermittent, it is greatly preferred for the introduction and admixing of ion exchange resin particles to occur only when the level of ionic impurities in the stream exceeds a preselected maximum level. The rate of ion exchange resin admixing is preferably such that, after a preselected contact time period, the level of ionic impurities is reduced to a preselected minimum level in the resulting so treated condensate stream. Thereafter, such resulting condensate stream is passed through a membrane filter to remove the dispersed and suspended solid particulate impurities in the condensate. The level of dispersed and suspended solids in the purified effluent stream from the membrane filter is dependent upon the particular characteristic of the membrane filter employed.

FIG. 1 provides two conductivity monitoring points; one at the influent, and the other at the effluent of the process. It is believed that the effluent conductivity, found by monitoring the boiler water or reactor water or treatment process effluent affords the most desirable control. The most precise control is obtained by monitoring both the influent and the effluent. Here, both signals may be fed to a PC type controller, which would in turn, regulates the amount of resin material fed. In the case of process streams in other applications, it is probably sufficient to just monitor the process effluent conductivity, thereby cutting down on costs and complexity.

It is generally sufficient for present purposes only to monitor the ionic impurities, as distinct from nonionic impurities, present in the stream since such monitoring is representative of the solute impurities present as the proportion of nonionic to ionic solute impurities tends to remain fairly constant.

While monitoring may be accomplished by any convenient means, it is presently preferred to measure the level of ionic impurities by measuring the conductance of all, or a representative portion, of the stream of condensate passing a fixed location along the flow path thereof transversely across the conduit.

In certain instances, the sample may first be passed through a hydrogen form cation exchange column to obtain the "acid" conductance. The sampling point may vary depending upon the type of plant and operating control requirements. For example, in a BWR plant the preferred sampling point may be the concentrated reactor water, in a PWR plant the steam generator water, in a drum boiler plant the boiler water, and in a once-thru boiler plant the economizer inlet.

Although the measurement of specific conductance is preferred, other analytical measurements may be made using suitable methods and instrumentation; for example, chlorides, silica, sulfates, pH, iron or OC may be measured in addition to conductance and the ion exchange resin feed system may be controlled on the basis of the level of one of these other constituents. Using "acid" conductance as the control basis, in a typical fossil fuel fired once-through boiler steam generating plant, the range of conductance in the feedwater that is acceptable is in the range of approximately 0.1 to 0.3 micromhos/centimeter. A rise above the range to 0.4 micromhos/centimeter, for example, would require prompt reduction by resin feeding. In certain plants a level of 0.3 micromhos/centimeter may call for reduction by resin feeding.

In a BWR plant, a normal level is approximately 0.1 micromhos/centimeter with 0.2 micromhos/centimeter calling for corrective action. See Table 1.

Preferably, when the measured conductance values are at unacceptably high values, then introduction of the ion exchange resin particles into the stream is initiated at a fixed location somewhat upstream from the location of the membrane filter. The injection point of the ion exchange materials is preferably located to allow as much contact time as possible with the feed stream prior to its entry into membrane filter vessel. A present preference is to allow about a 2-5 second contact time period.

Until the measured conductance values reach such unacceptably high values, preferably no ion exchange resin particles are introduced into the stream. When such introduction is underway, the rate of addition or body feeding of such resin particles is such that the quantity of the ion exchange resin particles so introduced is sufficient to reduce the level of the ionic impurities in the resulting stream to a level which is below a preselected value within a predetermined contact time period.

Immediately after the introduction or substantially at the time thereof, the particles of such resin are completely admixed with the stream by any conventional means. A present preference to achieve such a mixing is by simple injection. An option would include the use of standard commercially available inline static mixers.

The resulting stream is then passed into a membrane filter. The filter used is selected to have membrane characteristics such as are described and illustratively exemplified hereinbelow. Such characteristics are sufficient to produce an effluent from such filter that has a dispersed and suspended solids content that is within the desired ranges. For example, it is presently preferred to produce an effluent wherein the solids content is within the ranges shown in Table 1 below for a recycled condensate.

TABLE 1

| Contaminant | Typical Quality Required | | | Typical Quality Produced |
|---|---|---|---|---|
| | Fossil Fuel | BWR | PWR | |
| Suspended Solids (ppb) | <5 | <5 | <5 | <1 |
| Silica, Dissolved (ppb) | <5 | 1** | <10 | 1.0 |
| Iron, Total (ppb) | <10 | <1 | <10 | 0.2 |
| Copper, Total (ppb) | <2 | <0.5 | <2 | 0.3 |
| Sodium, (ppb) | <2 | — | <1 | 0.5 |
| "Acid" Conductance (Micromhos/CM @ 25° C.) | 0.15 | <0.1 | 0.1 | 0.08 |
| Chloride (ppb) | <2 | 0.15** | <1 | 0.20 |

**No Spec. Calculated from reactor water limit

For reasons of control, in the practice of this invention, it is preferred to monitor the ionic impurity level at the reactor water, the boiler water, condensate downstream of the process vessel or any other locations where the purity is measurable and feedback is provided to the control system. The advantage of monitoring the concentrated reactor or boiler water is that the contaminants are present at higher, more readily detected and measured concentrations.

When the measured concentration of the impurity reaches the upper limit set for it, a resin feed pump is activated and resin feeding continues until the level of impurity falls to the predetermined low limit at which time it is shutdown completely or reduced to a low, continuous feed rate.

When conductance is used as the monitory method, then the starting and stopping of the resin slurry feed is based on a conditioned signal from the conductance instrument.

The resin particles remain suspended in the main condensate stream until they enter the membrane filter vessel. In the membrane filter vessel, the distribution plate is preferably modified to allow a relatively low entrance velocity such that the flocced cation and anion exchange resin particles accumulate in the lower portions of the vessel, forming a blanket with a rolling type motion. This blanket gradually thickens as fresh, partially exhausted ion exchange material is fed.

Periodically, some accumulated resin may be removed by a short flush to waste, and at other times, a complete cleaning of the filter membrane modules and the accumulated resin is required as pressure drop builds up across the filter modules, in a manner well known in the precoat filter art.

During the passage of the resulting condensate stream through the membrane filter vessel, the relationship between the dispersed and suspended solid particulate impurities in the stream and in the membrane filter vessel is such that the level of dispersed and suspended impurities is reduced to a level which is below a preselected minimum value in the resulting filtered effluent stream leaving the membrane filter vessel.

(c) The Condensate Polishing Apparatus

Figure 2:
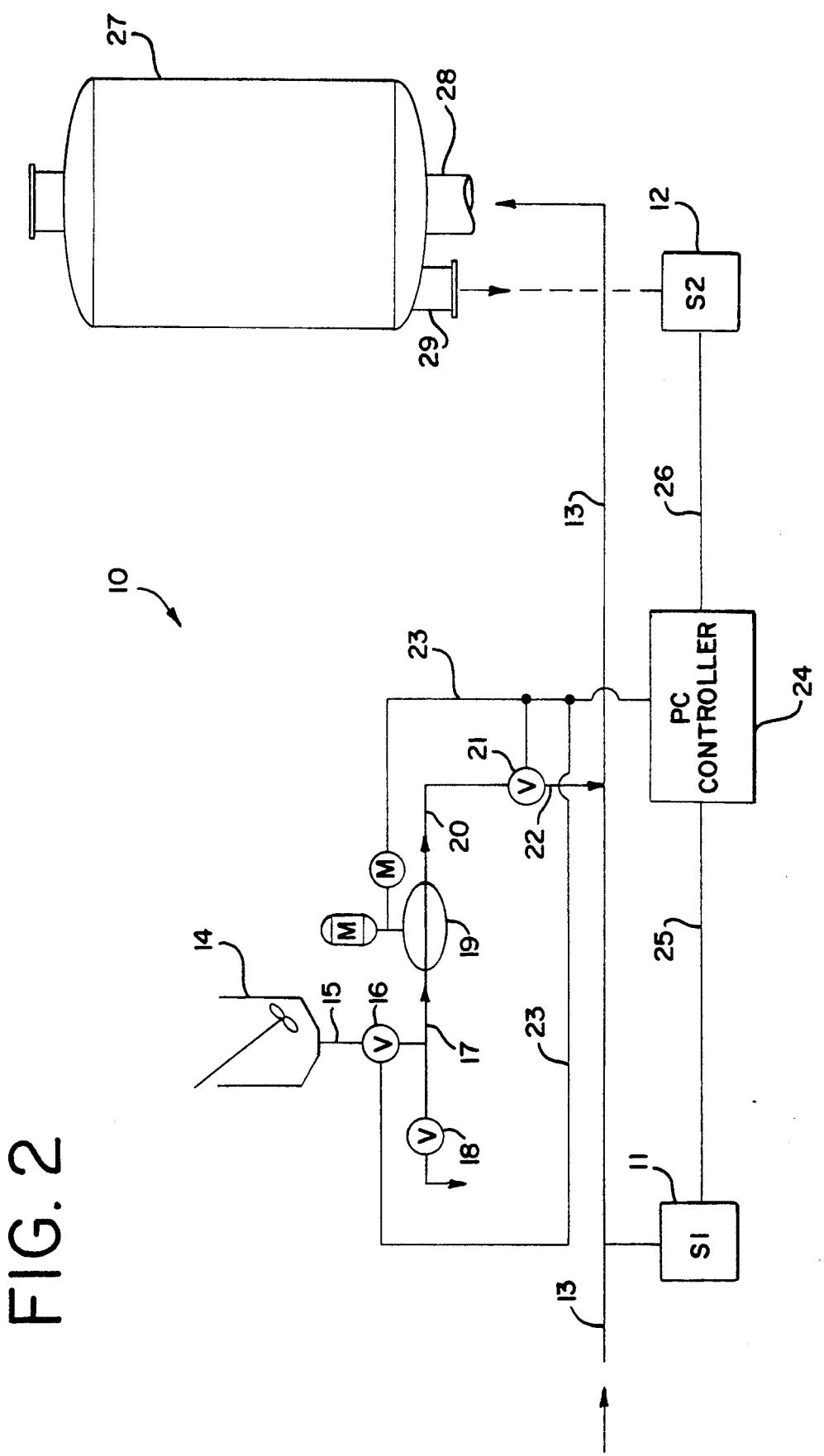
FIG. 2 is a schematic representation of one embodiment of apparatus suitable for the practice of the invention.

Referring to FIG. 2, there is shown a presently preferred apparatus 10 to practice the process of this invention. Apparatus 10 includes monitoring means 11 and 12 which are capable of measuring the level of ionic impurities in a flowing stream (not shown) moving along a flow pathway defined by a conduit 13. Monitoring means 11 and 12 are also capable of generating signal outputs, preferably electrical, which are representative of the impurity levels sensed. Suitable monitoring means, for example, include ion chromatography, ion specific glass electrodes, and the like. A present preference is a conductance measuring device, such as a conductivity monitors which are available commercially from Beckman Instruments, Leeds and Northup and others.

A reservoir means, such as a slurry tank 14 that is equipped with an agitator, is provided in which an aqueous slurry (not shown) of the ion exchange resin particles is prepared in a well known manner. The slurry is fed through connecting conduits 15 and 17 to a diaphragm chemical feed pump 19, having external controlled adjustable flow rate capabilities, and through conduits 20 and 22, to condensate feed stream conduit 13.

An aqueous slurry is preferably employed in apparatus 10 as distinct from a dry powder comprising the ion exchange resin particles because a slurry is easier to regulate and deliver in variable quantities. A suitable slurry may be prepared using water which is preferably deionized or distilled. A slurry may contain, for example, about 1.0 to about 10 weight percent of suspended ion exchange resin particles on a 100 weight percent total slurry basis although higher and lower quantities of such particles may be utilized, if desired. It is desirable to minimize the contact of the slurry with air to avoid formation of the anion carbonate from $CO_2$. Nitrogen blanketing is one way to accomplish this.

Valve 16 functions to provide an interlocked on/off feed control means from tank 14, and metering diaphragm pump 19 functions to provide rate metering means for introducing the slurry containing the ion exchange resin particles from tank 14 into the stream flowing in conduit 13. Valve 18 is a drainage valve for flushing and/or cleaning tank 14. Valve 21 serves as an additional on/off valve which is useful for blocking the resin feed system from the pressurized conduit 13 when the resin feed system is not in use, or pump 19 requires repairs and/or calibration.

A simple proportional controller or a more elaborate PC type controller 24 is provided which is connected to the monitoring means 11 and 12 by wires 25 and 26. The controller 24 in turn is connected to valves 16 and 21, and also the metering section of diaphragm pump 19. Controller 24 generates appropriate signals for operating valves 16 and 21, and also for operating pump 19.

Thus, when the level of ionic impurities in the stream 10 exceeds a preselected (or predetermined) level as sensed by monitoring means 11 and/or 12, valves 16 and 21 are opened, pump 9 is energized and a quantity of ion exchange resin is metered into conduit 13, which is predetermined to be suitable for achieving a lowering of the sensed ionic impurity levels down to a preselected value within a preselected contact time period using a known stream flow rate in conduit 13 in the region thereof between valve 16 and the membrane filter vessel 27.

Figure 4:
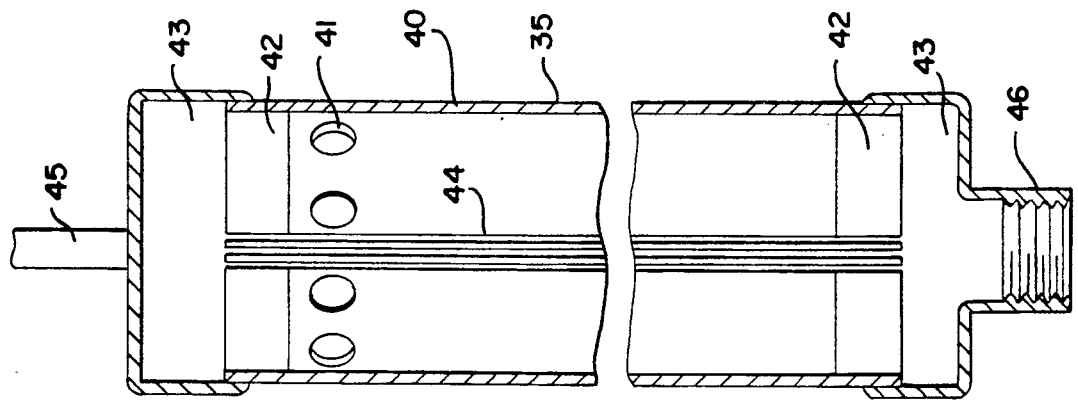
FIG. 4 is a vertical sectional view through a presently preferred embodiment of a hollow fiber filter module assembly adapted for use in the practice of the invention.

The membrane filter vessel 27 can have various structural forms. An illustrative and presently preferred structure for the filter vessel 27 is shown in FIGS. 3 and 4 and is described in the below provided accompanying portions of the specification.

Effluent condensate from filter vessel 27 is directly suitable for reuse as a boiler feed for steam generation.

Figure 3:
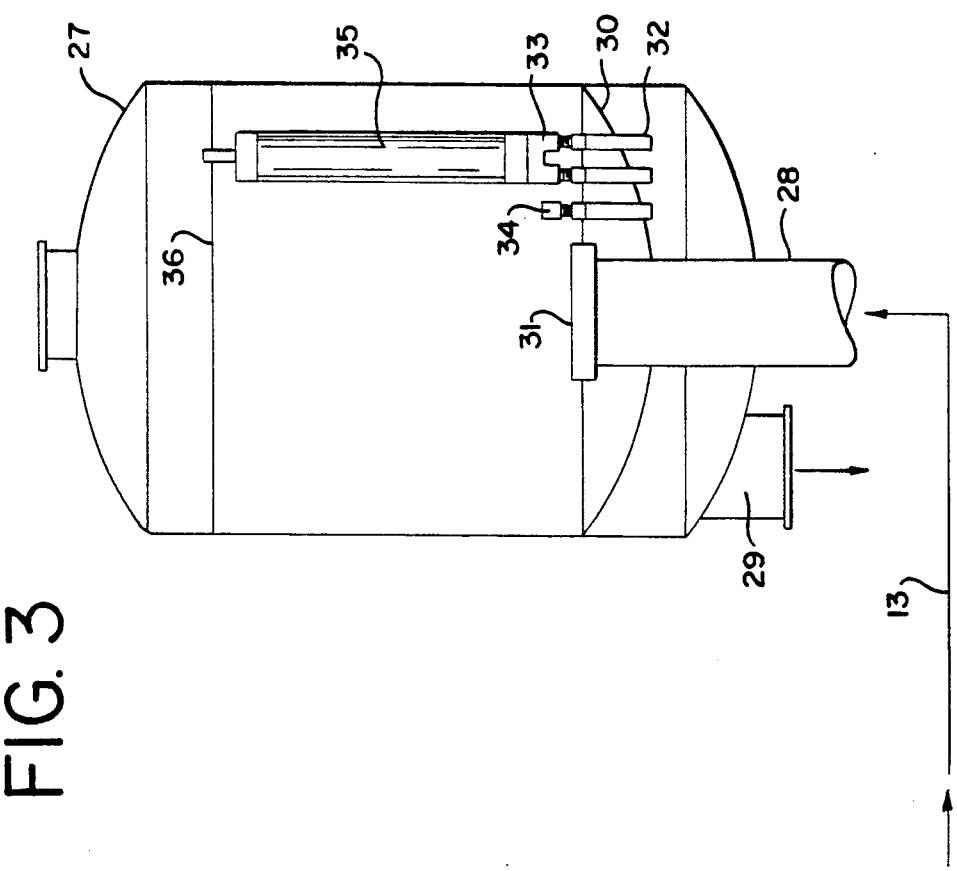
FIG. 3 is a schematic representation showing a presently preferred embodiment of a membrane filter mean for practicing the present invention.

Referring to FIG. 3, there is shown a presently preferred embodiment of the apparatus used for the present invention. In this case, a standard precoat filter vessel 27, having an inlet conduit 28, an outlet conduit 29, tube sheet 30 dividing the filter vessel into an upper filter chamber and a lower plenum chamber, tube sheet fittings 32, and general holding assembly 36, is retrofitted to receive a plurality of hollow fiber type modules 35. An example of such a vessel is disclosed in U.S. Pat. No. 4,269,707. The modules 35 are attached to the tube sheet fittings 32 by means of suitable adapters 33. These adapters 33 are preferably made of 303ss or 304ss and allow a designated number of hollow fiber modules to be fitted to a standard vessel 27. Depending upon the application, the number of required modules 35 per vessel 27 may vary, also changing the design of the adapters 33. In the likely case that not all of the tube sheet fittings 32 will be used, another adapter 34 for purposes of sealing will have to be utilized.

As mentioned previously, the distribution plate 31 is preferably modified to allow a lower distribution velocity than normal, to effect the formation of a rolling blanket of ion exchange material, which thicken with additional ion exchange material feed.

Referring to FIG. 4, there is seen a vertical, sectional view through an exemplary embodiment of a hollow fiber filter assembly (module) 35 adapted for use in the practice of this invention. The module 35 consists of a plurality of hollow fibers 44 inside a suitable housing 40, being potted with a compound 42. The number and type of hollow fibers 44, including porosity, pore size, and chemical composition is selected for the given application as is well known in the art. The potting material 42 can be standard materials such as epoxy or polyurethane; the former being preferred for condensate polishing applications. The modules themselves may be manufactured by current known methodology such as by centrifuged potting.

The modules are provided with an attachment means 46, which is threaded for easy connection and removal to the adapter 33 shown in FIG. 3, and an extension nut-type device 45, for stabilizing the module in the vertical position, which interlocks with the holding assembly 36 shown in FIG. 3. The sizes, locations, and number of inlet distribution holes 41 are determined based on the particular application. Also, a general design condition would call for the hollow fibers 44 to be open at both ends of the potting areas 42, with liquid being able to flow into areas 43. Alternative designs may be better suited for applications other than condensate polishing. Other well known membrane filter assemblies may be utilized in practicing the principles of the invention.

Although the present invention has been described and illustrated based on the presently available information and embodiments, it is to be understood that modifications and variations are within the spirit and scope of the invention, and those skilled in the art will readily appreciate and that such are within the purview and scope of the appended claims.

What is claimed is:

1. A method for removing suspended and colloidally dispersed solid impurities from an influent condensate, and for removing intermittently occurring ionic impurities contained in said influent condensate, comprising the steps of:
   (a) directing an influent condensate stream through a membrane filter for removal of said solid impurities from said influent condensate;
   (b) monitoring the level of said ionic impurities contained in said influent condensate stream;
   (c) feeding finely powdered ion exchange resin particles into said influent condensate upstream from said membrane filter for removal of said ionic impurities from said condensate when the level of said ionic impurities contained in said condensate exceed a preselected maximum level; and
   (d) terminating said feeding of said ion exchange resin into said influent condensate when the level of said ionic impurities contained in the resulting condensate is less than a preselected minimum level.

2. A method for polishing a condensate containing both dissolved ionic impurities and suspended and colloidally dispersed solid impurities, comprising the steps of:
   (a) monitoring the level of ionic impurities contained in an influent stream comprised of said condensate;
   (b) admixing finely divided ion exchange resin particles with said influent stream when the level of said ionic impurities in said stream exceeds a preselected maximum value, the rate of said admixing being such that the quantity of said ion exchange resin particles so admixed with said influent stream is sufficient to reduce the level of said ionic impurities in the resulting stream to a level which is below a preselected minimum value within a predetermined contact time period; and
   (c) passing said resulting stream after the contact time period into and through a membrane filter.

3. The method of claim 2 wherein the relationship between said dispersed and suspended solid impurities in said stream and said membrane filter is such that the level of said solid impurities in said stream is reduced during passage thereof through said membrane filter to a level which is below a preselected minimum value in the so filtered effluent stream from said membrane filter.

4. The method of claim 2 wherein said ion exchange resin particles are introduced at a first location along the flow pathway of said stream, and the start of said membrane filter occurs at a second location along said flow pathway, and the flow rate of said stream between said first location and said second location is such that said contact time period is not longer than the traverse time of said stream in flowing from said first location to said second location.

5. The method of claim 2 wherein said monitoring is carried out by measuring the conductance of said influent and/or effluent stream.

6. The method of claim 3 wherein said monitoring is carried out by measuring the conductance of said influent stream at a location along said flow pathway which precedes said first location, and/or follows said second location.

7. The method of claim 5 wherein the flow rate of said stream between said first location and said second location is preselected, and said contact time period is preselected, and wherein the quantity of said ion exchange resin particles so admixed is such that the final level of impurities in said resulting stream is not more than said preselected minimum value at the end of said contact time period.

8. The method of claim 2 wherein said admixing is terminated when said ionic impurities level in said stream declines below a preselected value.

9. The method of claim 2 wherein said monitoring is carried out by measuring conductance of said influent and/or effluent stream and the quantity of said ion exchange resin particles so admixed is proportional to the conductivity of said influent stream.

10. The method of claim 2 wherein said membrane filter includes a filter vessel containing hollow fibers through which said resulting stream passes.

11. The method of claim 10 wherein said ion exchange resin particles are substantially completely separated from said resulting stream in said filter vessel before said resulting stream is passed through said hollow fibers.

12. The method of claim 11 wherein said resulting stream passes into a lower portion of said filter vessel so as to induce low velocity currents in the lower portion of said filter vessel to cause a blanket with a gentle rolling motion of the separated ion exchange resin particles as they settle to the bottom of said filter vessel.

13. The method of claim 11 wherein the ion exchange resin particles accumulated on the bottom of said filter vessel are periodically removed from said filter vessel.

14. The method of claim 11 wherein said ion exchange resin particles have a size in the range from about 10 microns to about 200 microns.

15. The method of claim 14 wherein said ion exchange resin particles comprise a mixture of cation exchange resin particles and anion exchange resin particles.

16. The method of claim 15 wherein the dry weight ratio o said cation exchange resin particles to said anion exchange resin particles is in the range from about 1:1 to about 3:1.

17. The method of claim 14 wherein polymeric adsorbents are mixed with said ion exchange resin particles.

18. The method of claim 14 wherein powdered activated carbon is mixed with said ion exchange resin particles.

19. Apparatus for removing ionic impurities and suspended and colloidally dispersed solid impurities from an influent liquid, comprising:
  (a) monitoring means for monitoring the level of ionic impurities contained in an influent and/or effluent stream comprised of said influent liquid;
  (b) feeding means for admixing ion exchange resin particles with said influent stream at a rate such that the quantity of said ion exchange resin particles admixed is sufficient to reduce the level of the ionic impurities in the resulting stream to a level which is below a preselected minimum value within a predetermined contact time period when the level of impurities contained in said influent liquid exceeds and preselected maximum level; and
  (c) means for directing said resulting stream through a membrane filter for removing said solid impurities therefrom.

20. The apparatus of claim 19 wherein said feeding means includes a reservoir means for holding a supply of ion exchange resin particles.

21. Apparatus for removing suspended and colloidally dispersed solid impurities from an influent liquid, and also for removing ionic impurities intermittently contained in said influent liquid, comprising:
  (a) monitoring means for monitoring the level of said impurities in a flowing stream of said influent liquid and for generating a signal representative of said impurity level;
  (b) reservoir means for holding a supply of ion exchange resin particles;
  (c) feeding means including connecting conduit means for introducing said ion exchange resin particles from said reservoir into said stream;
  (d) control means for receiving said level signal and for generating a control signal for operating said feeding means, such that when said ionic impurities exceed a predetermined level the quantity of said ion exchange resin particles introduced into said stream is sufficient to reduce the level of said ionic impurities in the resulting liquid to a preselected level; and
  (e) membrane filter means for filtering said resulting liquid of said stream to separate said impurities therefrom.

22. The apparatus of claim 21 wherein said feeding means comprises variable pumping means and response means for operating said pumping means responsive to control signals received from said control means.

23. The apparatus of claim 21 wherein said monitoring means comprises means for measuring conductance across at least a portion of said stream.

24. The apparatus of claim 21 wherein said control means operates said feeding means so as to introduce said ion exchange resin particles at a rate that is proportional to the monitored level of ionic impurities.

25. The apparatus of claim 21 wherein said membrane filter means comprises a filter vessel having a tube sheet dividing said vessel into an upper filter chamber and a lower plenum chamber and a plurality of membrane filter modules extending into said filter chamber.

26. The apparatus of claim 21 wherein said membrane filter modules include hollow fibers.

27. The apparatus of claim 26 wherein said membrane filter modules are attached to fittings that extend through said tube sheet.

28. The apparatus of claim 25 wherein said filter vessel includes distribution means for directing said stream into said filter chamber so as to induce low velocity currents in the lower portion of said filter vessel to cause a blanket with a gentle rolling motion of separated ion exchange resin particles as it settles to the bottom of the filter chamber.

* * * * *